US008571548B2

United States Patent
Poikselkä et al.

(10) Patent No.: US 8,571,548 B2
(45) Date of Patent: Oct. 29, 2013

(54) METHOD AND SYSTEM FOR CHANGING A SUBSCRIPTION

(75) Inventors: Mikka Poikselkä, Espoo (FI); Mikael Heerman, Espoo (FI); Jaakko Rajaniemi, Helsinki (FI)

(73) Assignee: Sisvel International S.A., Luxembourg (LU)

( * ) Notice: Subject to any disclaimer, the term of this patent is extended or adjusted under 35 U.S.C. 154(b) by 1917 days.

(21) Appl. No.: 10/501,944

(22) PCT Filed: Jan. 21, 2002

(86) PCT No.: PCT/EP02/00548
§ 371 (c)(1),
(2), (4) Date: Jul. 21, 2004

(87) PCT Pub. No.: WO03/061236
PCT Pub. Date: Jul. 24, 2003

(65) Prior Publication Data
US 2005/0065801 A1    Mar. 24, 2005

(51) Int. Cl.
*H04W 4/00*  (2009.01)
*G06F 15/177*  (2006.01)

(52) U.S. Cl.
USPC .............. 455/432.3; 455/435.1; 455/435.2; 709/220; 709/221

(58) Field of Classification Search
USPC ............. 455/432, 426, 432.3, 435.1, 435.2; 709/220, 221
See application file for complete search history.

(56) References Cited

U.S. PATENT DOCUMENTS

| 5,943,619 | A  | * | 8/1999  | Coyne et al. ............ 455/433 |
| 6,285,882 | B1 | * | 9/2001  | Cornillat et al. ........ 455/435.1 |
| 6,363,144 | B1 |   | 3/2002  | Becher et al. .......... 379/211.01 |
| 6,556,823 | B2 | * | 4/2003  | Clapton et al. ......... 455/432.3 |
| 6,584,312 | B1 | * | 6/2003  | Morin et al. ............ 455/433 |
| 6,654,606 | B1 | * | 11/2003 | Foti et al. ............. 455/432.1 |

(Continued)

FOREIGN PATENT DOCUMENTS

EP   1 150 530 A2   10/2001
RU   99121839 A     8/2001

(Continued)

OTHER PUBLICATIONS

"$3^{rd}$ Generation Partnership Project; Technical Specification Group Services and System Aspects; IP Multimedia Subsystem (IMS); Stage 2 (Release 5)", 3GPP TS 23.228 V5.3.0 (Jan. 2002), 142 pgs.

(Continued)

*Primary Examiner* — Kevin Bates
*Assistant Examiner* — Robert B McAdams
(74) *Attorney, Agent, or Firm* — Harrington & Smith (57) ABSTRACT

The present invention relates to a method and system for changing a subscription information of a subscriber in a data network. When a subscriber profile or subscription information is changed or updated, this is detected and a registration procedure for registering a terminal device (40) of the subscriber to a new serving network element (12) is initiated in response to the result of a checking step for checking whether a capability of a network element (10) serving a terminal device (40) of said subscriber is still in accordance with said changed subscription information. Thereby, an automatic or semi-automatic adaptation of the serving entity to the changed subscription can be achieved.

32 Claims, 3 Drawing Sheets

(56) References Cited

U.S. PATENT DOCUMENTS

| | | | |
|---|---|---|---|
| 6,859,649 B1 * | 2/2005 | Denenberg et al. | 455/406 |
| 6,954,654 B2 * | 10/2005 | Ejzak | 455/560 |
| 7,440,744 B2 * | 10/2008 | Muniere et al. | 455/403 |
| 7,684,795 B2 * | 3/2010 | Salmivalli et al. | 455/433 |
| 2002/0131395 A1 * | 9/2002 | Wang | 370/349 |
| 2002/0147845 A1 * | 10/2002 | Sanchez-Herrero et al. | 709/245 |
| 2002/0169883 A1 * | 11/2002 | Bright et al. | 709/230 |
| 2004/0176091 A1 * | 9/2004 | Bajko et al. | 455/435.1 |
| 2004/0203763 A1 * | 10/2004 | Tammi | 455/435.1 |
| 2005/0117591 A1 * | 6/2005 | Hurtta et al. | 370/401 |
| 2005/0141481 A1 * | 6/2005 | Kauppinen | 370/352 |

FOREIGN PATENT DOCUMENTS

| | | |
|---|---|---|
| WO | WO 98/33342 | 7/1998 |
| WO | WO 98/43428 | 10/1998 |
| WO | WO 01/31883 A2 | 5/2001 |
| WO | WO 01/93523 | 12/2001 |
| WO | WO-02/091780 A1 | 11/2002 |
| WO | WO-02/091786 A1 | 11/2002 |

OTHER PUBLICATIONS

Garcia D Mills/Nokia G Mayer F Derome H Shieh/Motorola/BT/Lucent J Bharatia/Nortel/Hutchinson D Willis/Dynamicsoft M: "3GPP requirements of SIP; draft-garcia-sipping-3gpp-reqs-02.txt", Nov. 1, 2001, No. 2, Nov. 1, 2001, XP015013489, ISSN:000-0004.

* cited by examiner

METHOD AND SYSTEM FOR CHANGING A SUBSCRIPTION

FIELD OF THE INVENTION

The present invention relates to a method and system for changing a subscription information of a subscriber in a data network. In particular, the present invention relates to a change of a subscription in an Internet Protocol (IP) multimedia subsystem (IMS) environment.

BACKGROUND OF THE INVENTION

In order to achieve access independence and to maintain a smooth interoperation with wired terminals across the internet, the IMS as specified e.g. in the 3GPP specification TS 23.228 has been developed to be conformant to IETF (Internet Engineering Task Force) "Internet Standards". The IP multimedia core network (IM CN) subsystem enables network operators of mobile or cellular networks to offer their subscribers multimedia services based on and built upon Internet applications, services and protocols. The intention is to develop such services by mobile network operators and other $3^{rd}$ party suppliers including those in the Internet space using the mechanisms provided by the Internet and the IM CN subsystem. The IMS thus enables conversions of, and access to, voice, video, messaging, data and web-based technologies for wireless users, and combines the growth of the Internet with the growth in mobile communications.

Figure 1:
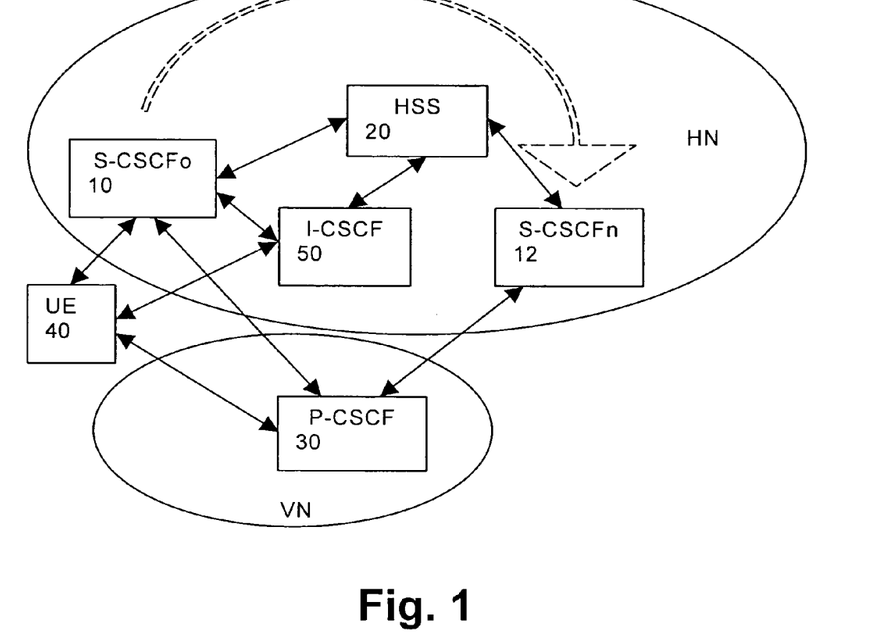
FIG. 1 shows a schematic network architecture in which the preferred embodiments of the present invention can be implemented.

FIG. 1 shows an architecture of an IMS network according to the above 3GPP ($3^{rd}$ Generation Partnership Project) specification. The architecture is based on the principle that the service control for home subscribed services for a roaming subscriber is in the home network HN, e.g. a Serving Call State Control Function (S-CSCF) is located in the home network HN. In FIG. 1, a current or old S-CSC-Fo 10 and a future or new S-CSCFn 12 are shown, between which a terminal device or user equipment (UE) 40 is to be transferred due to changed required capabilities resulting from a change in the subscriber profile of the UE 40.

In general, an S-CSCF performs the session control service for the served UEs. It maintains a session state as needed by the network operator for support of the services. Within an operator's network, different S-CSCFs may have different functionalities. The functions performed by the S-CSCF during a respective session are e.g. registration, session flow management, charging and resource utilization management. When a subscriber roams to a visited network VN, the visited network VN supports a Proxy-CSCF (P-CSCF) 30 which enables the session control to be passed to the respective S-CSCF located at the home network HN and providing the service control. Furthermore, an Interrogating-CSCF (I-CSCF) 50 is provided in the home network HN as a contact point within the operator's network for all connections destined to a subscriber of that network operator, or a roaming subscriber currently located within that network operator's service area. There may be multiple I-CSCFs within an operator's network. The functions performed by the I-CSCF 50 include assigning an S-CSCF to a user performing a registration procedure, routing a request received from another network towards the S-CSCF, maintaining the address of an S-CSCF from a subscriber database, e.g. a Home Subscriber Server (HSS) 20 as shown in FIG. 1, and/or forwarding requests or responses to the S-CSCF determined based on the address of change from the HSS 20.

The P-CSCF 30 is the first contact point within the IMS. Its address is discovered by the UE 40 following a PDP (Packet Data Protocol) contact activation. The P-CSCF 30 behaves like a proxy, i.e. it accepts requests and services them internally or forwards them on, possibly after translation. The P-CSCF 30 may also behave as a User Agent, i.e. in abnormal conditions it may terminate and independently generate transactions. The functions performed by the P-CSCF 30 are forwarding register requests received from the UE 40 to an I-CSCF, e.g. the I-CSCF 50, determined using the home domain name as provided by the UE 40, and forwarding requests or responses to the UE 40.

Further details regarding the functions of the different CSCF elements shown in FIG. 1 can be gathered from the above mentioned 3GPP-specification.

According to the conventional network architecture in the above mentioned 3GPP Release 5 specification, the HSS 20 is not aware of the kind of capabilities a specific S-CSCF has in the network. On the contrary, the HSS 20 knows what kind of capabilities an S-CSCF needs to support a specific subscriber. This information is stored in a subscriber profile of the specific subscriber. During an initial registration process of UE 40, the HSS 20 sends the required S-CSCF capabilities to the I-CSCF 50 and the actual selection of the S-CSCF is done by the I-CSCF 50. The selection at the I-CSCF 50 is performed on the basis of an information indicating the required capabilities and received from the HSS 20.

However, when there is a need for updating the subscriber profile e.g. in the S-CSCFo 10 currently serving the UE 40, the HSS 20 cannot know whether the selected S-CSCFo 10 is still capable of adequately serving the subscriber of the UE 40. It may be possible that new capabilities required according to the new subscriber profile are not supported by the S-CSCFo 10. Another possibility is that the service provider has removed some service from the subscriber profile and thus has prevented the usage of this service or service part.

If the capability of the S-CSCFo 10 does not meet with the updated subscriber profile, the subscriber is not able to use all subscribed services, or may received services which he or she is no longer willing to have. Furthermore, the subscriber may be charged for services which he or she has been cancelled. Moreover, if the network operator has denied services, the subscriber may still be able to use these services which he or she is no longer authorized to use.

SUMMARY OF THE INVENTION

It is therefore an object of the present invention to provide a method and system for changing a subscription, by means of which an adequate or matched serving function can be assured even after a change in the subscriber profile of a subscriber.

This object is achieved by a method for changing a subscription information of a subscriber in a data network, said method comprising the steps of:
detecting a change in said subscription information of said subscriber;
checking whether a capability of a network element serving a terminal device of said subscriber is still in accordance with said changed subscription information; and
initiating in response to the result of said checking step a registration procedure for registering said terminal device of said subscriber to a new serving network element.

Furthermore, the above object is achieved by a system for changing a subscription information of a subscriber in a data network, said system comprising:
detecting means for detecting a change in said subscription information of said subscriber;

checking means for checking whether a capability of a network element serving a terminal device of said subscriber is still in accordance with said changed subscription information; and initiating means for initiating in response to said checking means a registration procedure for registering said terminal device of said subscriber to a new serving network element.

Additionally, the above object is achieved by a subscriber database for storing a subscription information of a subscriber of a data network, said database being arranged to detect a change in said subscription information and to initiate a registration procedure for registering a terminal device of said subscriber to a new serving network element in response to the result of the checking operation for checking whether a capability of a network element serving a terminal device of said subscriber is still in accordance with said changed subscription information.

Accordingly, when a subscriber profile of a subscriber is updated or changed, a capability mismatch at the serving network element is automatically detected and a new serving network element having adequate capabilities is allocated by initiating the registration procedure. Thereby, any new subscription information can be taken into account almost immediately when it has been configured or stored in the subscriber database of the data network.

The checking step may comprise checking whether said serving network element is still capable of serving said terminal device of serving said terminal device of said subscriber in view of said changed subscription information.

The detection step may be based on a detection of a subscriber profile update, or may be based on a detection of a subscription of said subscriber to a new service.

According to an advantageous further development, the checking step may be performed on the basis of a capability information added based on said detection step to a response message of a registration procedure initiated by said terminal device. In this case, the registration procedure may be initiated by said terminal device in response to a de-registration procedure initiated when a change of said subscription information has been detected in said detection step. Alternatively, the registration procedure may be a periodic registration procedure initiated at predetermined intervals.

Preferably, a configuration information may be provided for determining subscribed services needing predetermined serving network elements.

According to another advantageous further development, the checking step may comprise the steps of transmitting a capability query comprising at least one required capability to the serving network element, comparing capabilities of the serving network element with the at least one required capability, and receiving an acknowledgement indicating the result of the comparing step from the serving network element. As an alternative, the checking step may comprise the steps of transmitting an information indicating at least one required capability and an identification of said serving network element to an interrogating network element, checking at said interrogating network element whether said serving network element fulfills said at least one required capabilities, and receiving an acknowledgement indicating the result of said checking step from said interrogating network element. Then, a de-register message for de-registering the terminal device may be sent to the serving network element in response to the received results of the comparing step. A re-registration procedure may then be initiated by the terminal device in response to a message issued by the serving network element. In this case, the de-register message may include a cause information which indicates that the reason for de-registration was a need for changing the subscriber information.

As an alternative to the network-initiated re-registration procedure, a selection function of the data network may be initiated using the at least one required capability, and a resulting identification information of the new serving network element may be notified to a proxy network element connected to the terminal device. The notification may be performed using an identification of the proxy network element stored at a subscriber database. The identification may be requested from the serving network element using the de-register message. The selection function may be performed by an interrogating network element.

As a further alternative, the checking step may be performed by requesting from the data network a capability list containing an information about required capabilities of serving network elements. In particular, the capability list may be requested from an interrogating network element. Thus, the checking means may be the interrogating network element, e.g. an I-CSCF of the IMS. The interrogating network element may be arranged to perform that checking operation based on a capability information received with a registration authorization response.

The detection means may be a subscriber database e.g. a HSS. Thus, the change of the subscriber profile at the subscriber database can be detected directly so as to check the capability and initiate a registration procedure, if required.

The initiating means may be the subscriber database, wherein the registration procedure is initiated by initiating the selection function of the data network core, or alternatively, by issuing the de-register message. As an alternative, the initiating means may be an interrogating network element arranged to issue a register message to the new serving network element.

The subscriber database may be arranged to inhibit an unnecessary registration based on a configuration information provided at said database.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

The preferred embodiments will now be described on the basis of an IMS network architecture as shown in FIG. 1.

The IMS shown in FIG. 1 refers to a set of core network entities using the services provided by the packet-switched domain to offer multimedia services. The HSS 20 is the master database for a given user and includes the functions of conventional home location registers (HLRs) as well as new functionalities specified to IP networks, such as the IMS. The HSS 20 is the entity containing the subscription-related information to support the network entities actually handling calls and/or sessions. The home network HN may contain one or several HSSs depending on the number of mobile subscribers, on the capacity of the equipment and on the organization of the network. The HSS 20 may integrate heterogeneous information, and enable enhanced features in the core network to be offered to the application and services domain. In particular, the HSS 20 is responsible for holding user-related information, such as user identification, numbering and address information, user security information, user location information, and user profile information. Based on this information, the HSS 20 is also responsible of supporting the call control and session management entities of the different domains and subsystems, such as the IMS, a Radio Network Subsystem (RNS), etc.

According to the preferred embodiments, a registration procedure for registering the UE 40 to the new S-CSCFn 12 is initiated if a capability check indicates that the current S-CSCFo 10 is no longer capable of serving the UE 40 after a change in the subscription information of the respective subscriber. This automatic or semi-automatic adaptation of the serving network element or entity in response to a capability check can be performed in various ways, as described in the following four preferred embodiments. When the subscription or subscriber profile is changed for a subscriber, e.g. the subscriber subscribes new service(s) it is possible that the already assigned S-CSCFo 10 cannot support the new service(s).

Figure 2:
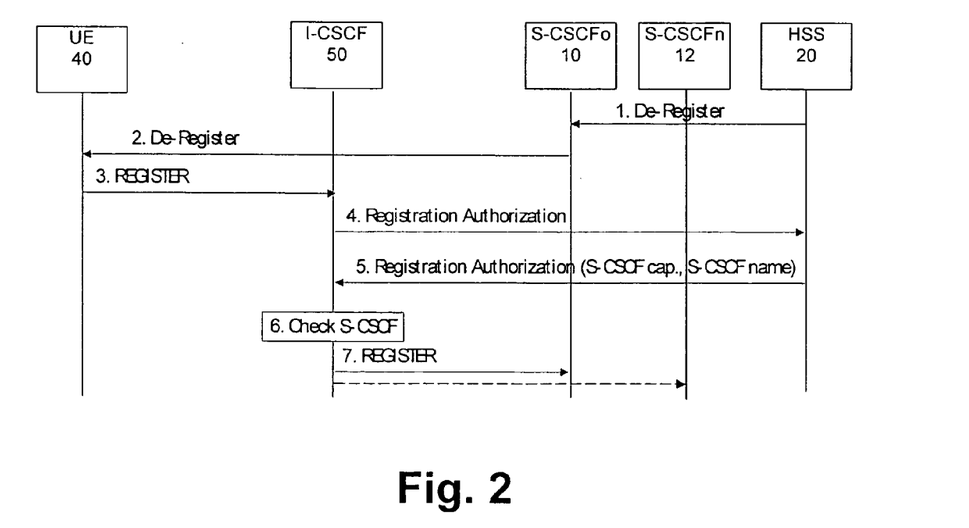
FIG. 2 shows a message signaling and processing diagram indicating a subscription change procedure according to a first preferred embodiment.

In order to assign a new S-CSCFn 12 capable for serving the subscriber, the following procedure indicated in FIG. 2 can be performed according to the first preferred embodiment.

As shown in FIG. 2, the HSS 20 de-registers the subscriber by sending a corresponding de-register message via the S-CSCFo 10 to the UE 40 (steps 1 and 2), which will lead to a situation where the UE 40 automatically initiates a new initial registration procedure, because the de-register message contains a cause code which indicates the reason for de-registration. This cause code or cause information is added by the HSS 20 in response to the detection of a change in the subscription information or subscriber profile of the concerned subscriber. This will lead to a situation where a new S-CSCF, e.g. the S-CSCFn 12, will be selected based on the new subscriber profile. In order to avoid unnecessary de-registrations, the HSS 20 may contain some configuration information used to determine what kind of services need special S-CSCFs. The UE 40 sends a registration message for a new registration to the I-CSCF 50 (step 3). The I-CSCF then sends a registration authorization message to the HSS 20 (step 4). As the HSS 20 knows that the subscription was changed, it sends a registration authorization response with the capability information and name of the current S-CSCFo 10 to the I-CSCF 50, instead of only the name of the S-CSCF 50 as in the conventional procedure. It is noted that the HSS 20 may as well only send the capability information of the current S-CSCFo 10 (step 5). Then, the I-CSCF 50 may use both or only the S-CSCF capability information to decide which actions it has to take, i.e. whether to select a new S-CSCF or not (step 6). Based on the checking result, the I-CSCF 50 either sends a registration message to the current S-CSCFo 10 or to a selected new S-CSCFn 12 having the required capability (step 7).

Thereby, the serving network function can be adapted to the changes in the subscriber profile of the concerned subscriber. If the old or current S-CSCFo 10 fulfills the S-CSCF capability requirements, the old S-CSCF 10 is selected during the new registration process.

Figure 3:
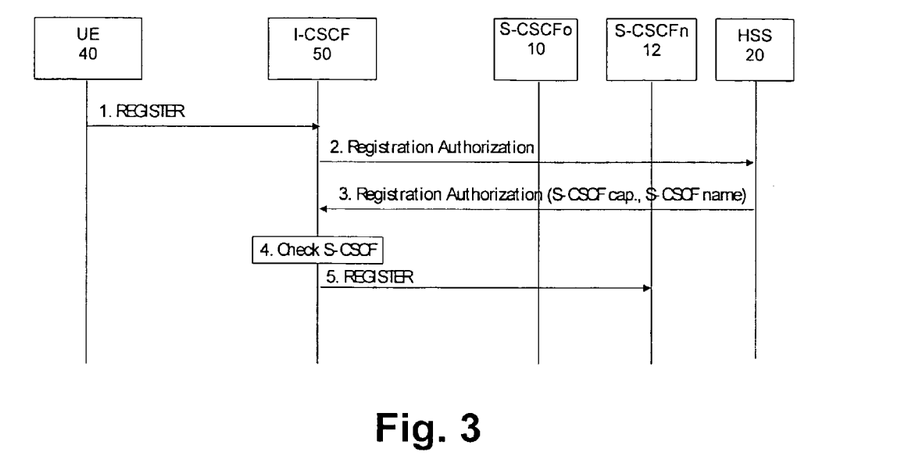
FIG. 3 shows a message signaling and processing diagram indicating a subscription change procedure according to a second preferred embodiment.

FIG. 3 shows a message signaling and processing diagram indicating a subscription change procedure according to the second preferred embodiment. In the second preferred embodiment, the HSS 20 does not initiate any actions before the UE 40 sends a normal periodic registration message to the network, e.g. to the I-CSCF 50 (step 1). When the periodic registration, i.e. a registration authorization message arrives at the HSS 20 (step 2), the HSS 20 knows that the subscription was changed and sends a registration authorization response message containing a capability information and name of the current S-CSCFo 10 to the I-CSCF 50 instead of only the name of the current S-CSCFo 10 (step 3). Also in the present case, it is noted that the HSS 20 may only send the capability information. The I-CSCF 50 uses both or only the S-CSCF capability information to decide which actions it has to take, i.e. whether to select a new-CSCF, e.g. the new S-CSCFn 12, or not (step 4). In the case shown in FIG. 3, the new S-CSCFn 12 is selected by transmitting a register message to the S-CSCFn 12 (step 5) because the old assigned S-CSCFo 10 does not fulfill the requirements in order to provide the appropriate services for the subscriber of the UE 40.

In the above described first and second preferred embodiments, the automatic re-registration may be accompanied by a new functionality to clear the name of the old S-CSCFo 10 from the HSS 20 or to provide a corresponding flag information.

According to the following third and fourth preferred embodiments, the HSS 20 first checks whether the current S-CSCFo 10 supports the new requirements needed by the changed subscriber profile or subscription information and initiates a corresponding subscriber profile or serving entity selection or change procedure, based on the result of the checking operation. If the current S-CSCFo 10 can support the new requirements, the new subscriber profile is updated in the current S-CSCFo 10. If the current S-CSCFo 10 cannot support the new requirements, then the HSS 20 starts a procedure leading to a change to the new S-CSCFn 12. It is noted that in the third and fourth preferred embodiments it is assumed that the UE 10 is located in the visited network VN and connected via the P-CSCF 30.

According to the third preferred embodiment, a network-initiated de-register procedure is started, which leads to a situation where the UE 40 automatically initiates a new initial re-registration procedure due to the fact that a de-register message issued by the HSS 20 contains a cause code which unambiguously reveals the reason for the de-registration. This leads to a situation where the new S-CSCFn 12 will be selected based on the new subscriber profile.

Figure 4:
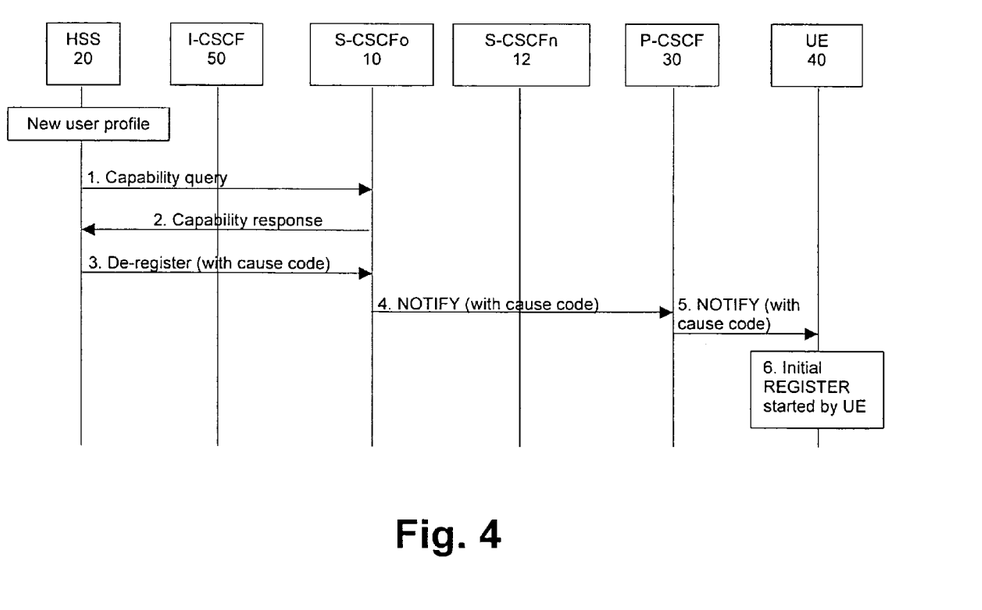
FIG. 4 shows a message signaling and processing diagram indicating a subscription change procedure according to a third preferred embodiment.

FIG. 4 shows a message signaling and processing diagram indicating a subscription change procedure according to the third preferred embodiment. When a new subscriber profile has been issued, the HSS 20 sends a capability query to the currently selected S-CSCFo 10 (step 1). The capability query contains the new required capabilities. It is noted that this operation could be added to the existing profile uploading from the HSS 20 to the current S-CSCF 10 or it could be a new mechanism between the HSS 20 and the current S-CSCFo 10. The current S-CSCFo 10 compares its own capabilities to the required capabilities and makes a decision whether it can support the required capabilities, or not. Then, the current S-CSCFo 10 sends a capability response to the HSS 20, including a positive or negative acknowledgement (step 2). If the current S-CSCFo 10 cannot serve the subscriber anymore due to lack of capabilities, it will send a negative acknowledgement. If the current S-CSCFo 10 can still serve the subscriber, it will send a positive acknowledgement to the HSS 20. If a new subscriber profile was send, a current S-CSCFo 10 may store it for further use.

If the HSS 20 receives a positive acknowledgement, then it ends the selection or change procedure. If the subscriber profile was not sent in step 1, then the HSS 20 starts a subscriber profile uploading procedure as specified in the above mentioned 3GPP specification.

If the HSS 20 receives a negative acknowledgement, it initiates a network-initiated de-registration process by sending a de-register message to the current S-CSCFo 10 with a cause code which clearly identifies that the reason was a need for updating the subscriber profile (step 3). The current S-CSCFo 10 receives the message from the HSS 20 and generates an appropriate SIP (Session Initiation Protocol) message, e.g. a NOTIFY message, with an appropriate cause code and sends it to the P-CSCF 30 (step 4). The P-CSCF 30 then forwards the SIP message to the UE 40 (step 5). This allows the UE 40 to automatically and immediately start a re-registration procedure. In particular, the UE 40 receives the SIP message transmitted in steps 4 and 5 and detects the need for registration. Then, the UE 40 starts a registration process as specified in the above mentioned 3GPP specifications (step 6). Thereby, an adequate serving network entity can be selected.

According to the fourth preferred embodiment, the HSS 20 starts a new procedure which would change the assigned current S-CSCFo 10 to the new S-CSCFn 12 supporting the new requirements without involving the UE 40. It may be possible that the network is not able to deliver the network initiated de-register message to the UE 40, e.g. if the UE 40 has not been subscribed to a registration event report package.

Figure 5:
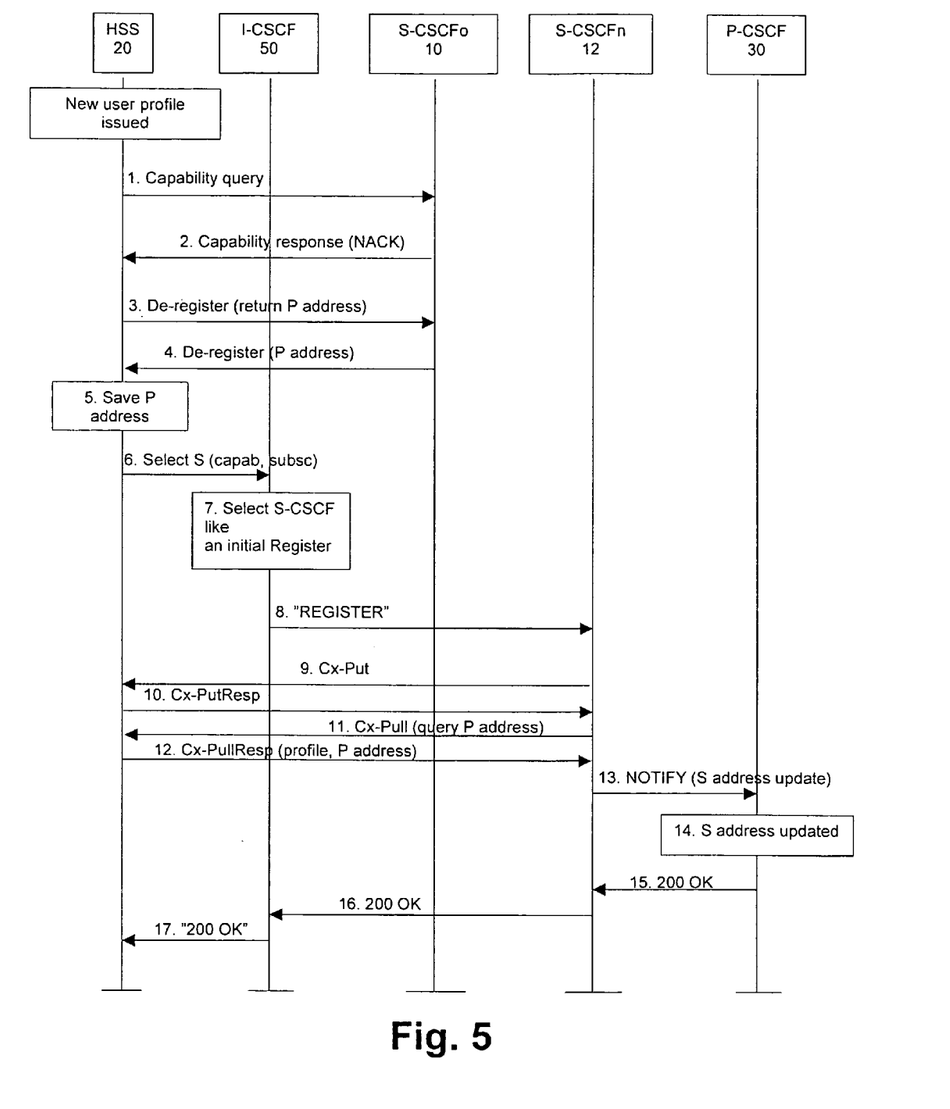
FIG. 5 shows a message signaling and processing diagram indicating a subscription change procedure according to a fourth preferred embodiment.

FIG. 5 shows a message signaling and processing diagram indicating a subscription change procedure according to the fourth embodiment. When a new subscriber profile has been issued, the HSS 20 sends a capability query to the current S-CSCFo 10 (step 1). The capability query contains new required capabilities according to the new subscriber profile. Also in the present case, the operation could be added to the existing profile uploading from the HSS 20 to the current S-CSCFo 10 or it could be a new mechanism between the HSS 20 and the current S-CSCFo 10.

Having received the capability query, the current S-CSCFo 10 compares its own capabilities to the required capabilities and makes a decision whether it can support the required capabilities, or not. If the current S-CSCFo 10 cannot anymore serve the subscriber due to lack of capabilities, it will send a capability response with a negative acknowledgement to the HSS 20 (step 2). If the current S-CSCFo 10 can still serve the subscriber, it will send a positive acknowledgement to the HSS 20. If a new subscriber profile was sent to the current S-CSCFo 10, then it stores it for further use.

If the HSS 20 receives a positive acknowledgement, it ends the procedure.

If the subscriber profile was not sent in step 1, then the HSS 20 starts a subscriber profile uploading procedure as specified in the above mentioned 3GPP specifications.

If the HSS 20 receives a negative acknowledgement, as indicated in FIG. 5, the HSS 20 sends a de-register message to the current or old S-CSCFo 10 which currently serves the subscriber of the UE 40. This message contains a request for the address and/or name of the P-CSCF 30 of the visited network VN (step 3). The current S-CSCFo 10 receives the de-register message and acknowledges the message with the address and/or name of the P-CSCF 30 (step 4). The current S-CSCFo 10 may then delete the existing subscriber profile of the concerned subscriber. Due to the fact that the de-register message contained a request to send the address and/or name of the P-CSCF 30, the current S-CSCFo 10 does not send any notification to the P-CSCF 30. The HSS 20 receives the acknowledgement with the address and/or name of the P-CSCF 30 and temporarily stores the subscribers' P-CSCF address and/or name (step 5). It is noted that the address and/or name of the P-CSCF 30 may be stored permanently in the HSS 20. Then, it is not necessary for the HSS 20 to request the address and/or name of the P-CSCF 30 in step 3.

In step 6, the HSS 20 sends a message to the I-CSCF 50, including the subscriber identity and new capabilities required by the subscriber according to the changed subscription information. This message may be a message to initiate a selection function for selecting a new serving entity. In response to the receipt of the message, the I-CSCF 50 initiates a new S-CSCF selection for the subscriber based on the new required capabilities (step 7). Then, the I-CSCF 50 sends a register message to the newly selected S-CSCFn 12 including the subscriber identity (step 8). In response thereto, the new S-CSCFn 12 starts a subscriber profile uploading procedure as specified in the above mentioned 3GPP specification (steps 9 to 12).

When the subscriber profile has been updated, the new S-CSCFn 12 generates an appropriate SIP message, e.g. a NOTIFY message, including the address of the new S-CSCFn 12, and sends it to the P-CSCF 30 (step 13). In step 14, the P-CSCF 30 stores or updates the S-CSCF address to be used in future sessions (step 14). Finally, the P-CSCF 30 acknowledges to the new S-CSCFn 12 with a SIP 200 OK message, the new S-CSCFn 12 acknowledges to the I-CSCF 50 with a SIP 200 OK message, and the I-CSCF 50 sends a corresponding acknowledgement to the HSS 20. Then, the serving network entity has been adapted to the changed subscriber profile.

The capability checking operation performed by the HSS 20 in the third and fourth preferred embodiment may be replaced by the following checking procedure. According to this alternative checking procedure, the HSS 20 may send a query for a capability list to the I-CSCF 50. This message may contain the required capabilities of the new S-CSCF. Then, the I-CSCF 50 checks the required capabilities and reports the list of available S-CSCFs to the HSS 20. The HSS 20 then checks if the current S-CSCFo 10 is included in this capability list.

As a further alternative checking procedure, the HSS 20 may send the address of the current or old S-CSCFo 10 together with the new required capabilities according to the updated or changed subscriber profile to the I-CSCF 50 in a corresponding updating message, in a first step. Then, in a second step, the I-CSCF 50 acknowledges to the HSS 20 whether the old S-CSCF 10 fulfills the new requirement(s). Based on the acknowledgement received from the I-CSCF 50, the HSS 20 may then act in the following alternative ways. If the requirement(s) is/are fulfilled by the old S-CSCFo 10, a profile update from the HSS 20 to the I-CSCF 50 is initiated. If not, the HSS 20 initiates a network initiated de-registration procedure or S-CSCF selection procedure as described in connection with FIGS. 4 and 5, respectively.

The need for capability negotiation may be decreased by using a default S-CSCF instead of the capability based selection. Thus, when it is detected that the current S-CSCFo 10 is not capable of serving the subscriber in view of the changed subscription information, the default S-CSCF could be selected.

Furthermore, the capability query of the HSS 20 may be integrated to an existing PPR diameter command in the Cx interface between the HSS 20 and the S-CSCF and/or I-CSCF functionality.

If the UE 40 cannot be informed to make a new registration in the third preferred embodiment, the P-CSCF 30 may initiate the new registration after receiving the notifying message. Then, the only element which requires changes would be the P-CSCF 30.

As a further alternative, the HSS 20 may know all capabilities of the S-CSCFs provided in the network. To achieve this, a corresponding table may be stored at the HSS 20. Then, the capability queries either from the I-CSCF 50 or the current S-CSCFi 10 would not be required in the third and fourth preferred embodiments. The checking operation may then be performed within the HSS 20. Moreover, if the HSS 20 contains some configuration information, unnecessary de-registrations can be avoided.

Additionally, in the context of a subscriber profile update it may be notified that the old S-CSCF 10 does not support a new subscriber profile allocated thereto. Then, a change of the S-CSCF may be initiated based on a negotiating procedure similar to the capability queries of the first and second embodiments. I.e., if the old S-CSCF 10 receives the new subscriber profile from the HSS 20, it sends an acknowledgement message which may contain a reason, e.g. "service failed" or "service not known" etc., to the HSS 20, indicating that it does not support this kind of profile.

It is noted that the present invention is not restricted to the preferred embodiments described above. The present invention may be implemented in any data network, where a subscription information of a subscriber has impact on the required capabilities of the serving network element. Thus, the designations and functions of the network elements or entities and signaling messages may be different in other or future data networks. The embodiments may thus vary within the scope of the attached claims.

The invention claimed is:

1. A method, comprising:
   detecting a change in subscription information of a subscriber;
   checking whether a capability of an old Serving Call State Control Function (S-CSCFo) serving a terminal device of said subscriber is still in accordance with said changed subscription information; and
   initiating, in response to a result of said checking being that said capability of said S-CSCFo serving said terminal device of said subscriber is not still in accordance with said changed subscription information, a registration procedure for registering said terminal device of said subscriber to a new Serving Call State Control Function (S-CSCFn) that is in accordance with said changed subscription information.

2. A method according to claim 1, wherein said checking comprises checking whether said S-CSCFo is still capable of serving said terminal device of said subscriber based on said changed subscription information.

3. A method according to claim 1, wherein said detecting is based on a detection of a subscriber profile update.

4. A method according to claim 1, wherein said detecting is based on a detection of a subscription of said subscriber to a new service.

5. A method according to claim 1, wherein said checking is performed on the basis of a capability information added based on said detecting a response message of a re-registration procedure initiated by said terminal device.

6. A method according to claim 5, wherein said re-registration procedure is initiated by said terminal device in response to a de-registration procedure initiated when a change of said subscription information has been detected in said detecting.

7. A method according to claim 5, wherein said re-registration procedure is a periodic re-registration procedure initiated at predetermined intervals.

8. A method according to claim 1, wherein a configuration information is provided for determining subscribed services needing predetermined S-CSCFs.

9. A method according to claim 1, wherein said checking further comprises:
   transmitting a capability query comprising an information indicating at least one required capability to said S-CSCFo,
   comparing capabilities of said S-CSCFo with said information about said at least one required capabilities, and
   receiving an acknowledgement indicating the result of said comparing from said S-CSCFo.

10. A method according to claim 1, wherein said checking further comprises:
    transmitting an information indicating at least one required capability and an identification of said S-CSCFo to an interrogating Call State Control Function (I-CSCF),
    checking at said I-CSCF whether said S-CSCFo fulfills said at least on required capabilities, and
    receiving an acknowledgement indicating the result of said checking from said I-CSCF.

11. A method according to claim 9, further comprising:
    sending a de-register message for de-registering said terminal device to said S-CSCFo in response to the received result.

12. A method according to claim 11, wherein a re-registration procedure is initiated by said terminal device in response to a message issued by said S-CSCFo.

13. A method according to claim 11, wherein said de-register message includes a cause information which indicates that the reason for de-registration was a need for changing said subscriber information.

14. A method according to claim 13, wherein said cause information is used by said terminal device to detect that a re-registration is required.

15. A method according to claim 9, wherein a selection function of said data network is initiated using said information about said at least one required capability, and a resulting identification information of said S-CSCFn is notified to a proxy Call State Control Function (P-CSCF) connected to said terminal device.

16. A method according to claim 15, wherein said notification is performed using an identification of said P-CSCF stored at a subscriber database.

17. A method according to claim 16, wherein said identification is requested from said S-CSCFo using said de-register message.

18. A method according to claim 15, wherein said selection function is performed by an I-CSCF.

19. A method according to claim 1, wherein said checking is performed by requesting from said data network a capability list comprising required capabilities of S-CSCFs.

20. A method according to claim 19, wherein said capability list is requested from an I-CSCF.

21. An apparatus, comprising:
    a memory comprising computer program code; and
    a processor;

the memory and the computer program code configured to, with the processor, cause the apparatus to perform at least the following:

detecting a change in a subscription information of a subscriber; and initiating a registration procedure for registering a terminal device of said subscriber to a S-CSCFn in response to a result of a checking operation that has checked whether a capability of a S-CSCFo serving said terminal device of said subscriber is still in accordance with said changed subscription information and that has determined said result is that said capability of said S-CSCFo serving said terminal device of said subscriber is not still in accordance with said changed subscription information, and wherein said S-CSCFn is in accordance with said changed subscription information.

22. An apparatus according to claim 21, wherein said initiating further comprises initiating said registration procedure by issuing a de-register message.

23. An apparatus according to claim 21, wherein said initiating further comprises initiating said registration procedure by initiating a selection function to select said S-CSCFn.

24. An apparatus according to claim 21, wherein said apparatus is a home subscriber server.

25. An apparatus according to claim 21, wherein said memory and said computer program code are further configured to, with the processor, cause the apparatus to perform inhibiting an unnecessary registration based on a configuration information provided at said apparatus.

26. An apparatus, comprising:
a memory comprising computer program code; and
a processor;
the memory and the computer program code configured to, with the processor, cause the apparatus to perform at least the following:
registering to a S-CSCFo providing session control services for said apparatus,
receiving a de-register message containing a cause information, which indicates a reason for the de-register message, the reason indicating that a result of a checking operation for checking a capability of the S-CSCFo indicates that the capability is not in accordance with a change in subscription information of a subscriber associated with the apparatus;
in response to said de-register message, initiating automatically a new initial registration procedure for registering said apparatus to a S-CSCFn providing session control services for said apparatus, wherein the S-CSCFn is in accordance with said changed subscription information.

27. An apparatus according to claim 26, wherein said de-register message is a message in accordance with a session initiation protocol.

28. An apparatus according to claim 27, wherein said de-register message is a session initiation protocol NOTIFY-message.

29. An apparatus, comprising:
a memory comprising computer program code; and
a processor,
the memory and the computer program code configured to, with the processor, cause the apparatus to perform at least the following:
checking whether a capability of a current S-CSCFo serving a terminal device of a subscriber is still in accordance with a change in subscription information; and
in response to a result of the checking indicating the capability of the current S-CSCFo serving the terminal device of the subscriber is not still in accordance with the change in subscription information, performing a registration procedure for registering said terminal device to a S-CSCFn that is in accordance with the change in subscription information.

30. An apparatus according to claim 29, wherein the memory and the computer program code are further configured to, with the processor, cause the apparatus to perform:
sending a registration authorization message to a subscriber database in response to a registration message for a new registration of said terminal device;
receiving in response to the registration authorization message a response message comprising capability information corresponding to the current S-CSCFo; and
using the capability information in the checking.

31. An apparatus according to claim 29, wherein said apparatus is an interrogation call state control function of an Internet Protocol multimedia subsystem.

32. A computer program product comprising a non-transitory computer-readable memory medium bearing computer program code embodied therein for use with a computer, the computer program code comprising:
code for detecting a change in subscription information of a subscriber;
code for checking whether a capability of a S-CSCFo serving a terminal device of said subscriber is still in accordance with said changed subscription information; and
code for initiating, in response to a result of said checking being that said capability of said S-CSCFo serving said terminal device of said subscriber is not still in accordance with said changed subscription information, a registration procedure for registering said terminal device of said subscriber to a S-CSCFn that is in accordance with said changed subscription information.

* * * * *

UNITED STATES PATENT AND TRADEMARK OFFICE
CERTIFICATE OF CORRECTION

PATENT NO.        : 8,571,548 B2
APPLICATION NO.   : 10/501944
DATED             : October 29, 2013
INVENTOR(S)       : Mikka Poikselkä, Mikael Heerman and Jaakko Rajaniemi It is certified that error appears in the above-identified patent and that said Letters Patent is hereby corrected as shown below:

In the Claims:

In Claim 10:
Column 10, line 26, "interrogating Call" should be deleted and --interrogating network element Call-- should be inserted.

In Claim 10:
Column 10, line 28, "on" should be deleted and --one-- should be inserted.

In Claim 13:
Column 10, line 40, "includes a cause which indicates" should be deleted and --comprises a cause information configured to indicate-- should be inserted.

In Claim 31:
Column 12, line 34, "interrogation" should be deleted and --interrogating-- should be inserted.

Signed and Sealed this
Twenty-eighth Day of January, 2014

Michelle K. Lee
*Deputy Director of the United States Patent and Trademark Office*